United States Patent
Kurian

(10) Patent No.: US 10,320,764 B2
(45) Date of Patent: Jun. 11, 2019

(54) MAGNETIC STRIP MODIFICATION

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 319 days.

(21) Appl. No.: 15/180,647

(22) Filed: Jun. 13, 2016

(65) Prior Publication Data

US 2017/0359325 A1 Dec. 14, 2017

(51) Int. Cl.
*H04L 29/06* (2006.01)
*G06K 19/06* (2006.01)
*G06Q 20/34* (2012.01)

(52) U.S. Cl.
CPC ...... *H04L 63/062* (2013.01); *G06K 19/06187* (2013.01); *G06Q 20/349* (2013.01); *G06Q 20/3552* (2013.01); *G06Q 20/3572* (2013.01)

(58) Field of Classification Search
CPC ............ H04L 63/062; H04L 2209/56; G06K 19/06187; G07F 7/086; G06Q 20/12; G06Q 20/204; G06Q 20/34; G06Q 20/346; G06Q 20/349; G06Q 20/354; G06Q 20/355; G06Q 20/3552; G06Q 20/3572; G06Q 20/385; G06Q 20/40; G06Q 20/409

See application file for complete search history.

(56) References Cited

U.S. PATENT DOCUMENTS

| | | | |
|---|---|---|---|
| 4,684,795 A | 8/1987 | Colgate, Jr. | |
| 4,786,791 A | 11/1988 | Hodama | |
| 5,163,098 A * | 11/1992 | Dahbura | G06Q 20/04 705/75 |
| 6,138,917 A | 10/2000 | Chapin, Jr. | |
| 6,223,984 B1 | 5/2001 | Renner et al. | |
| 6,510,983 B2 | 1/2003 | Horowitz et al. | |
| 7,114,652 B2 | 10/2006 | Moullette et al. | |
| 7,357,319 B1 | 4/2008 | Liu et al. | |
| 7,472,829 B2 * | 1/2009 | Brown | G06K 19/06206 235/380 |

(Continued)

OTHER PUBLICATIONS

Ian Molloy et al., Dynamic Virtual Credit Card Numbers, Financial Cryptography and Data Security FC 2007, LNCS 4886, pp. 208-223 (Springer 2007) (Year: 2007).*

*Primary Examiner* — Theodore C Parsons
(74) *Attorney, Agent, or Firm* — Banner & Witcoff, Ltd.; Michael A. Springs

(57) ABSTRACT

Systems and arrangements for providing secure event processing by modifying a magnetic strip, chip, or the like, on a device are provided. In some examples, a device may include a magnetic strip that may be encoded with a first identifier. The first identifier may be a string of characters and may include a key. Upon using the device, the data from the magnetic strip may be read and the first identifier may be retrieved. The system may process the retrieved first identifier to extract the key which may be used to retrieve user and/or account information. In some arrangements, the account information may be used to process the event and a second identifier, may be generated. The device may be modified to include the second identifier, which may be used in processing a subsequent event. In some examples, the first identifier may be deleted from the device.

21 Claims, 9 Drawing Sheets

(56) References Cited

U.S. PATENT DOCUMENTS

| | | | | |
|---|---|---|---|---|
| 7,844,550 | B2 * | 11/2010 | Walker | G06Q 20/04 705/39 |
| 8,352,370 | B1 * | 1/2013 | White | G06Q 40/02 705/38 |
| 8,376,239 | B1 * | 2/2013 | Humphrey | G06K 7/084 235/493 |
| 2001/0013542 | A1 | 8/2001 | Horowitz et al. | |
| 2003/0218066 | A1 | 11/2003 | Fernandes et al. | |
| 2006/0163353 | A1 | 7/2006 | Moulette et al. | |
| 2007/0045399 | A1 * | 3/2007 | Martin | G06K 19/06187 235/380 |
| 2012/0024950 | A1 * | 2/2012 | Bonalle | G06K 19/06187 235/380 |
| 2016/0335531 | A1 * | 11/2016 | Mullen | G06K 19/07345 |

* cited by examiner

US 10,320,764 B2

MAGNETIC STRIP MODIFICATION

BACKGROUND

Aspects of the disclosure relate to computer hardware and software. In particular, one or more aspects of the disclosure generally relate to computer hardware and software for modifying a magnetic strip to provide improved security.

Various types of devices rely on magnetic strips to maintain data that may be used to process events, such as account numbers, user information, and the like. Unauthorized users may attempt to access the data found on the magnetic strip in order to process unauthorized transactions. Accordingly, storing the data used to process events directly on the device in the magnetic strip may make user vulnerable to unauthorized attempts to access a user's account or other information. Accordingly, limiting the amount or type of usable data stored on the magnetic strip of a device may be advantageous.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to computer systems that provide for secure event processing by modifying a magnetic strip on a device to include modified data. In some examples, a device may include a magnetic strip that may be encoded with a first identifier. The first identifier may be a string of characters and may include a key. Upon swiping a device through an event processing device, the data from the magnetic strip may be read and the first identifier may be retrieved from the data. The system may process the retrieved first identifier to extract the key which may then be used to retrieve user and/or account information. For instance, the key may be used as an input in a query of a database of user and/or account information.

In some arrangements, the account information may be used to process the event and a second identifier, different from the first identifier but having a same number of characters may be generated. The device may be modified to include the second identifier, which may be used in processing a subsequent event. In some examples, the first identifier may be deleted from the device (e.g., from the magnetic strip on the device).

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
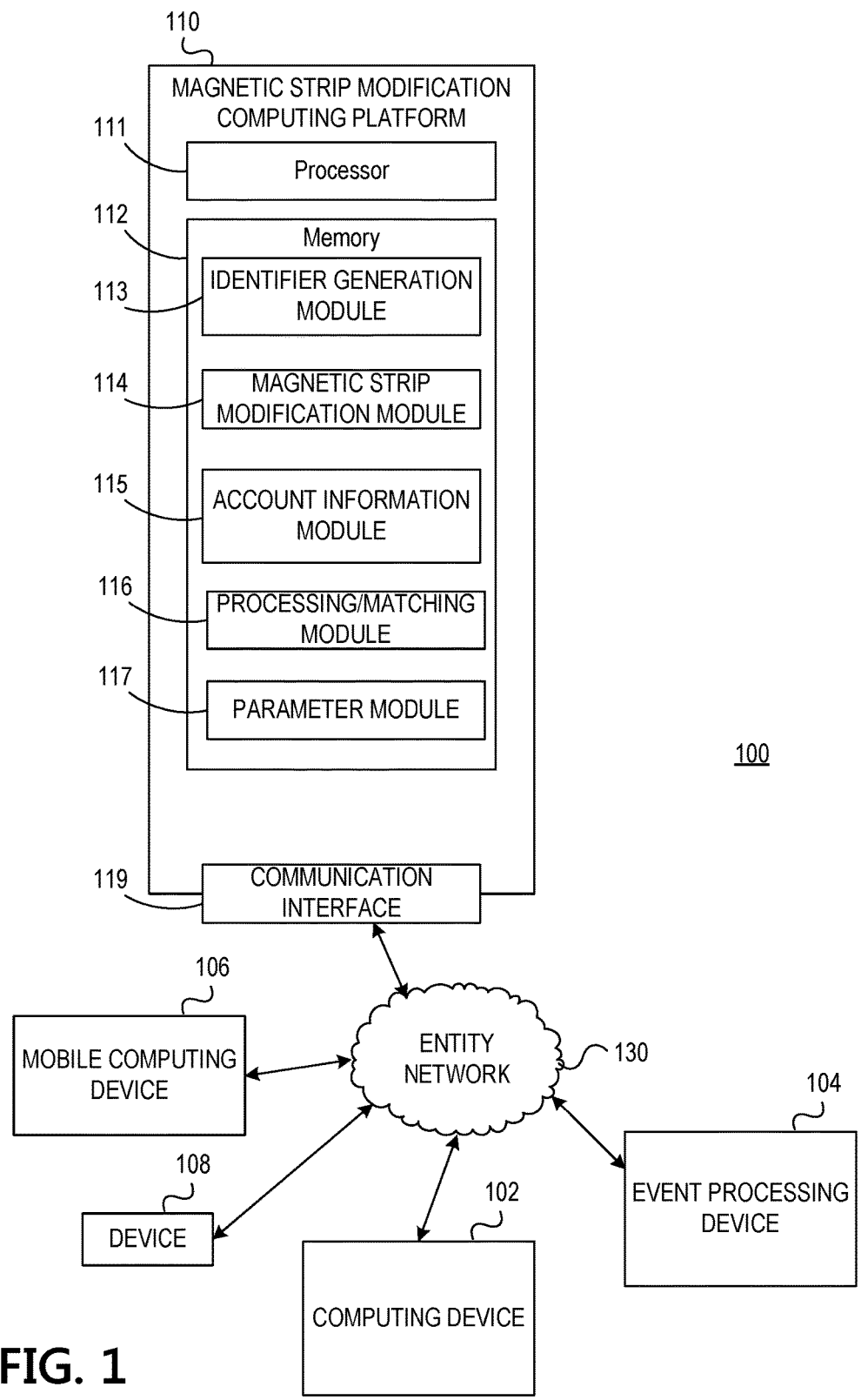
FIG. 1 depicts an illustrative magnetic strip modification computing platform for providing secure event processing according to one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed herein, people often use device, such as payment devices, to make purchases, process transactions, and the like. Data associated with the device, such as user information, account information, and the like, is often stored on a magnetic strip on the device. This data is read from the magnetic strip when the device is swiped through an event processing device. However, when user and account information is stored directly on the magnetic strip, a person gaining access to the magnetic strip and associated data through unauthorized means may then be able to use the device, unauthorized information, and the like, to conduct unauthorized activity.

Accordingly, the arrangements described herein include generating a first identifier that may be encoded on the magnetic strip on the device. In some examples, the first identifier may be encoded instead of user information, account information, and the like. The first identifier may be a string of characters. When the first identifier is read from the device (e.g., via the event processing device) the first identifier may be processed and a key may be extracted from the first identifier. The key may be a portion or subset of the characters in the first identifier (e.g., consecutive, non-consecutive, a combination thereof) and may be used to link the device to user information, account information, and the like, that may be used to complete or process the event being processed.

Upon processing the event, a second, subsequent identifier may be generated and encoded on the device. The first identifier may then be deleted. When a user attempts to use the device to process a second event, the second identifier may be read from the device, the key extracted, and the event processed with the user and/or account information linked to the device via key. Additional identifiers may then be generated upon use of a previous identifier or upon a predetermined number of uses of the previous identifier.

Although various aspects described herein may be described in terms of a magnetic strip on a device, one or more aspect may be used with other data storage arrangements, such as with a device having a smart chip embedded on the device, via an application operating or executing on a computing device, such as a mobile device, via a radio frequency identifier (RFID) embedded on a device, via one or more smart card arrangements, and the like.

These and various other arrangements will be discussed more fully herein.

FIG. 1 depicts an environment 100 including an illustrative computing platform for modifying a magnetic strip or other data storage arrangement on a device according to one or more aspects described herein. For instance, the environment 100 includes a magnetic strip modification computing platform 110, which may include one or more processors 111, memory 112, and communication interface 119. A data bus may interconnect processor(s) 111, memory 112, and communication interface 119. Communication interface 119 may be a network interface configured to support communication between magnetic strip modification computing platform 110 and one or more networks (e.g., network 130). One or more computing or other devices 102, 104, 106, 108 may be in communication with the magnetic strip modification computing platform 110 (e.g., via network 130). Memory 112 may include one or more program modules having instructions that when executed by processor(s) 111 cause the magnetic strip modification computing platform 110 to perform one or more functions described herein, and/or one or more databases that may store and/or otherwise maintain information which may be used by such program modules and/or processor(s) 111. In some instances, the one or more program modules and/or databases may be stored by and/or maintained in different memory units of magnetic strip modification computing platform 110 and/or by different computer systems that may form and/or otherwise make up the magnetic strip modification computing platform 110. In some arrangements, different features or processes performed may be performed by different sets of instructions, such that the processor may execute each desired set of instructions to perform different functions described herein.

For example, memory 112 may include an identifier generation module 113. The identifier generation module 113 may include hardware and/or software configured to perform various functions within the magnetic strip modification computing platform 110. For instance, the identifier generation module 113 may generate one or more identifiers that may be associated with a device, such as a payment device including debit cards, credit cards, and the like. The identifier may be a string of numeric characters or an alphanumeric string and may be encoded or written onto a magnetic strip on a device. The identifier may, in some arrangements, include a key which may be used to link the device to account information of a user associated with the device (e.g., in order to complete processing of an event). For instance, in some arrangements, the identifier may be 32 characters in length. A portion or subset of the characters, or characters in particular positions within the string, may form a key such that when the device is swiped, such as via an event processing device 104, the identifier may be read from the magnetic strip and the key may be extracted from the identifier. In some examples, the key may include non-consecutive characters of the identifier. In other examples, the key may include two or more consecutive characters, as well as non-consecutive characters. Various combinations of consecutive and non-consecutive characters may be used for the key. As will be discussed more fully below, the key may also be characters in predetermined random positions within the identifier, or a pattern of positions within the identifier.

The identifier read from the magnetic strip or other data storage arrangement, such as a smart chip embedded in a device, or the like, (e.g., by the event processing device 104) may be transmitted (e.g., via network 130) to the magnetic strip modification computing platform 110 which may process the received identifier, for example, by the processing/matching module 116. The processing/matching module 116 may include hardware and/or software configured to perform various functions within the magnetic strip modification computing platform 110. For instance, the processing/matching module may receive the identifier and determine or extract the key from the identifier. The key may then be used to link the identifier (and device being used to process the event via the event processing device 104) to account information associated with the device 108, user associated with the device, and the like. The linking of the identifier to the account and/or user information via the key may be performed by the processing/matching module 116 and, upon identifying the appropriate account or user, the processing matching module 116 may retrieve account or user data, such as from account information module 115. In some examples, the event may then be processed based on the retrieved account/user information. Accordingly, a device being used to read data from the magnetic strip or other data storage arrangement of the device 108 without authorization may obtain the identifier but would not be able to process any events without the appropriate key to link the identifier to the account information in order to process the event.

Once the event has been processed, or the identifier has been read from the device 108, a second identifier may be generated, such as by the identifier generation module 113. The second identifier may be different from the first or a previously generated identifier but may include the key which may be used to link the identifier to the account information, user, or the like, for later or subsequent uses of the device 108. Additional identifiers, each including the key, may be generated for a particular device (e.g., after each use of the device, after an event, or the like).

Once a second or subsequent identifier is generated, the magnetic strip on the device 108 may be modified to include the new identifier, such as via the magnetic strip modification module 114. Additionally or alternatively, the smart chip may be modified to include the new identifier. The magnetic strip modification module 114 may cause the magnetic strip (or other data storage arrangement) on the device 108 to be modified to delete the first or previously encoded or written identifier and to write or encode the second or subsequent identifier to the magnetic strip (or other data storage arrangement) on the device 108. In some examples, this may be performed via the event processing device 104. For instance, upon swiping (or otherwise using the device to process an event) the device 108, the magnetic strip, chip, or other storage arrangement, may be read to extract the identifier and the new identifier may be written to the magnetic strip or other data storage arrangement of the device 108. In another example, a device 108 may be swiped via the event processing device 104 to process an event. The first identifier from the magnetic strip on the device 108 may be read and the event may be processed, as discussed above. Upon processing the event, a user may swipe the device 108 again in order to delete the first identifier from the magnetic strip and write the second or subsequent identifier to the magnetic strip on the device 108.

In yet another example, near-field communication may be used to write the second or subsequent identifier to the device 108. For instance, a user may execute an application operating on a mobile computing device 106 of the user. The application may be downloaded or otherwise provided to the mobile computing device 106 and may be associated with an entity providing or associated with the device 108. The application may receive an indication that an identifier has been read from a device 108 and may receive a second or subsequent identifier (e.g., from the identifier generation module 113). The mobile computing device 106 may then use, for example, near-field communication to detect a presence of the device 108 within a predetermined proximity of the mobile computing device 106 and may then write the second or subsequent identifier to the magnetic strip, chip, or other data storage arrangement of the device 108 based on the proximity of the device 108 to the mobile computing device 106.

The environment 100 may further include one or more additional computing devices, such as computing device 102. The computing device 102 may be connected to or in communication with the magnetic strip modification communication platform 110 (e.g., via the network 130) and may be used to set one or more parameters associated with the identifiers. In some examples, the parameters may be set by the computing device 102 communicating with the parameter module 117. For instance, the computing device 102 may be used to set, via the parameter module 117, a number of digits or characters of an identifier, a number of uses of an identifier before the identifier is deleted and replaced, and the like. The computing device 102 may further be used to identify, via the parameter module 117, a key to be used to link the identifier to a user or user's account information (e.g., number of characters, position of characters in string, or the like). Various other parameters may be set using the computing device 102 and parameter module 117, and the parameters may be set by a system administrator or other authorized user.

Figure 2A:
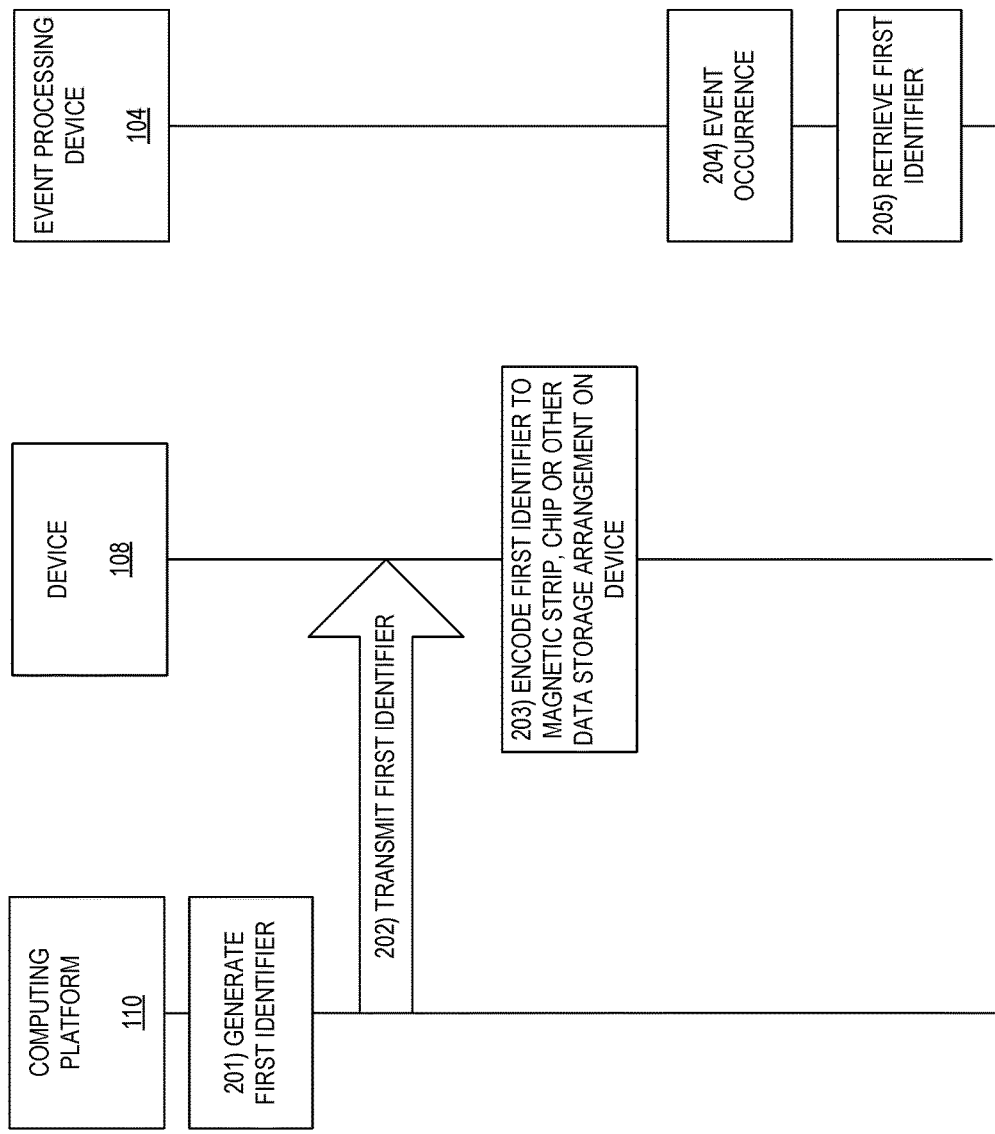
FIGS. 2A-2C depict an illustrative event sequence for modifying a magnetic strip on a device to provide secure event processing according to one or more aspects described herein.
Figure 2B:
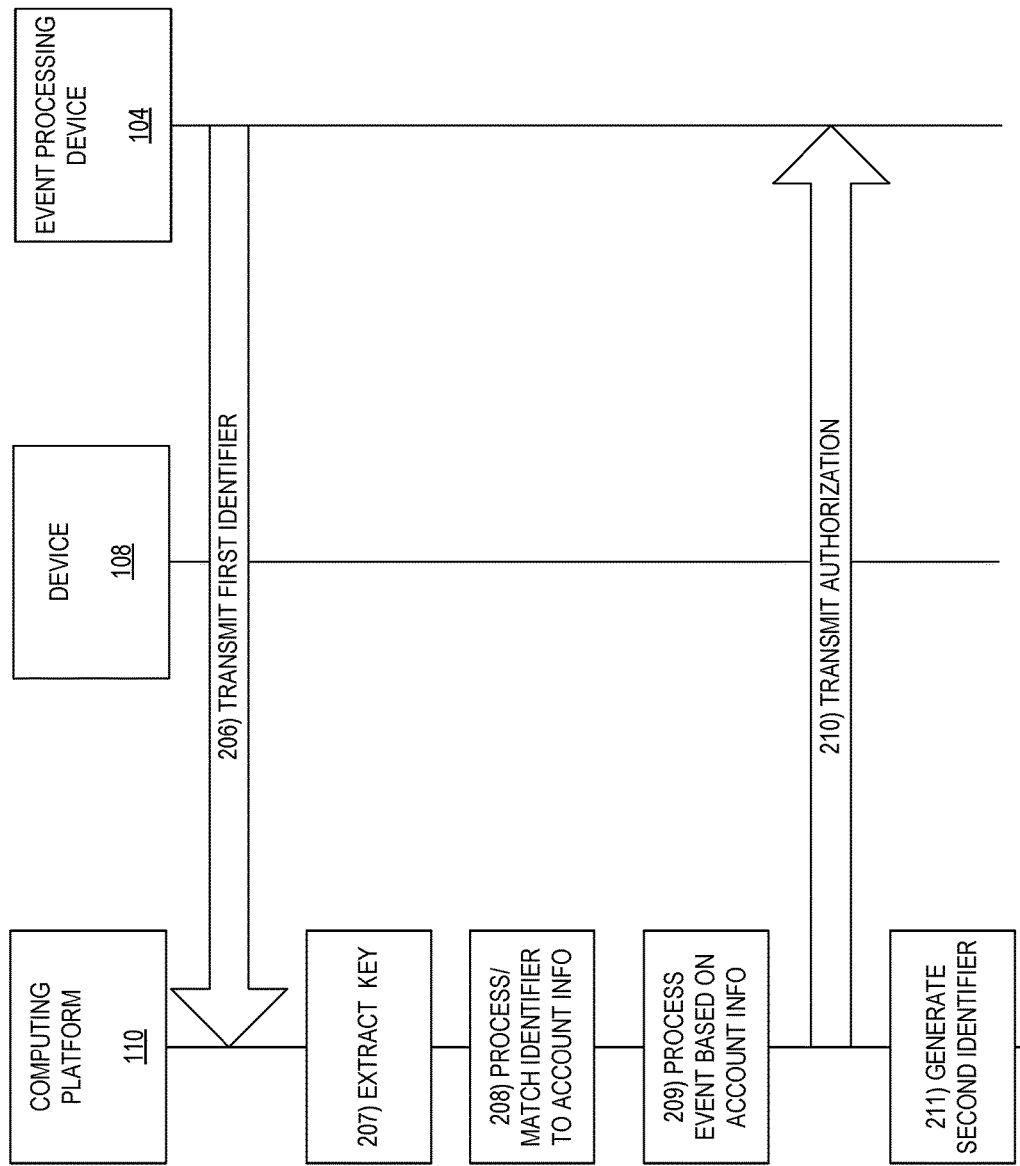
Figure 2C:
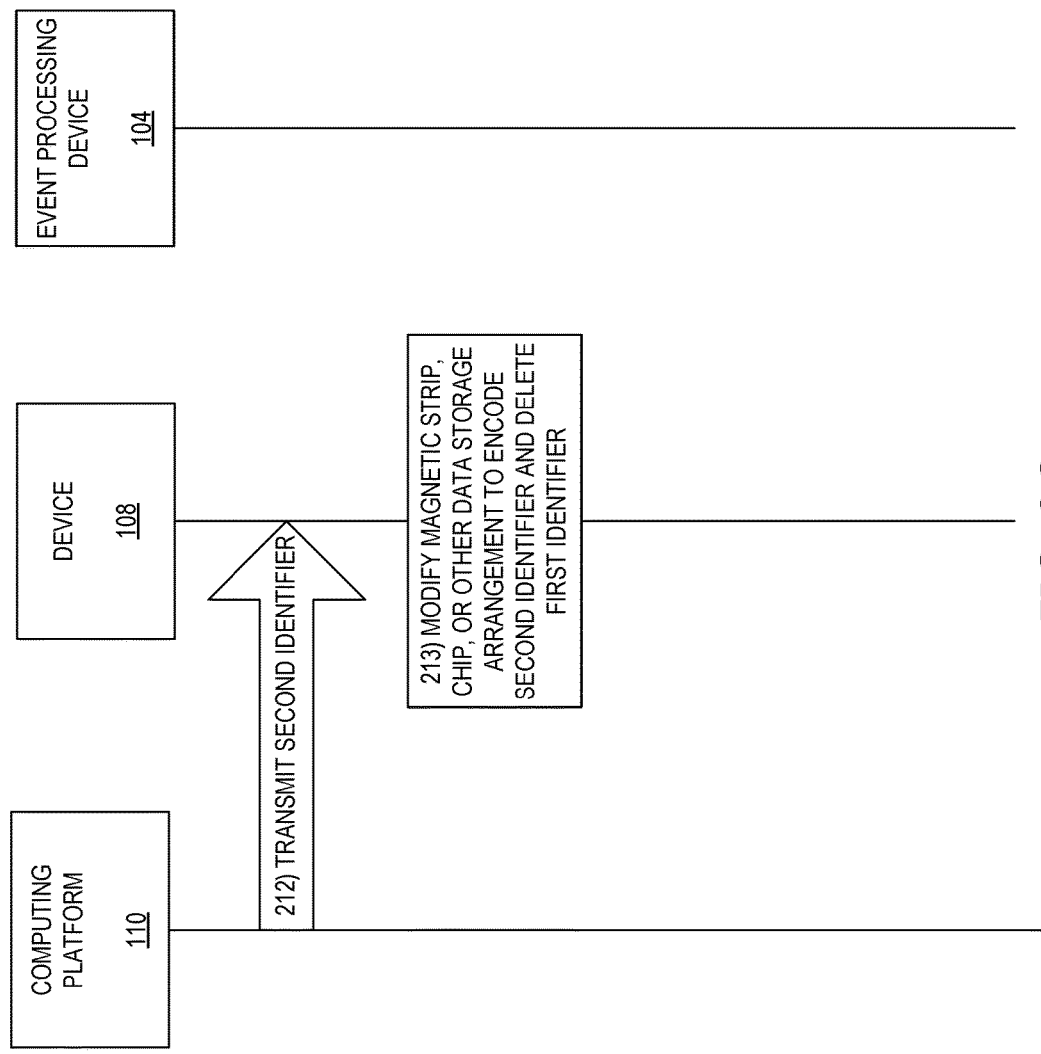

FIGS. 2A through 2C illustrate one example event sequence for modifying magnetic strip data to provide secure event processing in accordance with one or more aspects described herein. The sequence illustrated in FIGS. 2A-2C is merely one example sequence and various other events may be included, or events shown may be omitted, without departing from the invention.

In step 201, a first identifier may be generated at the magnetic strip modification computing platform 110. As discussed above, the first identifier may be a string of characters (numeric, alpha-numeric, or the like) that may be encoded or otherwise written to a magnetic strip, chip, or other data storage arrangement on a device, such as a payment device (e.g., credit card, debit card, or the like). The identifier may be of varying lengths (e.g., 32 characters, 64 characters, 20 characters, or the like) and may include a key that may be used to link the device to user and/or account information of a user associated with the device. Accordingly, if an unauthorized user obtains the first identifier (e.g., via an event processing device or other unauthorized access) the device may remain unusable to the unauthorized user because the unauthorized user would not have access to the key and thus, could not obtain the account information needed to process an event, such as a transaction.

In step 202, the first identifier may be transmitted to the device 108 and in step 203, the magnetic strip, chip, or other data storage arrangement on the device 108 may be modified to include the first identifier (e.g., the first identifier may be encoded or written to the magnetic strip, chip, or the like). In some examples, this process may be performed with the initial production of the device 108. In other examples, the magnetic strip, chip, or other data storage arrangement, may be modified after the device is in use, as will be discussed more fully herein.

In step 204, an event may occur at an event processing device 104. For instance, a user may use the device 108 to process an event (e.g., make a purchase, perform another type of transaction, or the like). The user may swipe or otherwise insert the device 108 through the event processing device 104 to permit the magnetic strip, chip, or other data storage arrangement (and associated data) to be read by the event processing device 104. In step 205, the event processing device 104 may retrieve the first identifier from the magnetic strip, chip, or other data storage arrangement on the device 108.

With reference to FIG. 2B, the retrieved first identifier may be transmitted from the event processing device 104 to the magnetic strip modification computing platform 110 in step 206. In step 207, a key may be extracted from the first identifier by the magnetic strip modification computing platform 110. For instance, the magnetic strip modification computing platform 110 may determine that the characters in every other position within the first identifier should be extracted as the key to determine account information for the user. For instance, if a first identifier includes 32 characters, the system, in the example above, may indicate that characters 1, 3, 5, 7 . . . 31, comprise the key that may be used to identify the user information and/or account information.

In another example, the identifier may be 64 characters and every fourth character may be extracted as the key to be used for matching. In still other examples, the system may identify various patterns of character positions that form the key. For instance, the first character, second character, fourth character, fifth character, seventh character, eighth character, and the like, may form a pattern that may be used to extract the key. In still other examples, predetermined random character positions may form the key. Various other patterns and arrangements may be used without departing from the invention.

Upon extracting the key from the first identifier, the magnetic strip modification computing platform 110 may process the key and/or match the key to a user and/or account information of a user associated with the device 108. For instance, the key extracted from the first identifier may be used to identify user information and/or account information of a user (e.g., account or device number, expiration date of device, security code of device, and the like). In some examples, the user information and/or account information may be stored in a lookup table and the key may be used to access that information. In some arrangements, the user and/or account information may be stored in one or more databases and the key may be used as an input in a query to retrieve the stored user and/or account information. Various other methods of storing the user information and/or account information (e.g., types of databases, database storage schemes, and the like) may be used without departing from the invention.

The user information and/or account information may then be used to process the event and, in step 210, authorization of the event may be transmitted from the magnetic strip modification computing platform 110 to the event processing device 104. Accordingly, the processing of the event may be completed at the event processing device 104.

In step 211, a second identifier may be generated. The second identifier may be a string of characters (e.g., numeric, alpha-numeric, and the like). The second identifier may include a same number of characters as the first identifier and may also include the key.

With reference to FIG. 2C, the second identifier may be transmitted to the device in step 212. In step 213, the second identifier may be encoded or written to the magnetic strip, chip, or other data storage arrangement of the device and the first identifier may be deleted from the magnetic strip, chip, or other data storage arrangement of the device. Accordingly, even if an unauthorized user obtains the first identifier, the first identifier may only be viable until it is used (or for a predetermined number of uses). The first identifier may then be deleted and replaced by the second identifier which may then be used to process subsequent events.

Similar to the arrangement discussed above, the second identifier may be used to process an event and, in doing so, the key may be extracted from the second identifier which may be used to determine user information and/or account information to process the event, similar to the arrangements discussed above with respect to the first identifier. In some examples, the system may use a same or similar pattern or character positions to form the key. For instance, if the key from the first identifier included every other character, the key from the second identifier may also include every other character. In other arrangements, the characters used for the key may also vary or rotate. For instance, the system may use a first set of character positions or first pattern when extracting the key from the first identifier and may use a second, different set of characters or a second, different pattern when extracting the key from the second identifier. This may add an additional layer of security in that, even if an unauthorized user could obtain a first key, the rotation of the characters used to identify the key may be vary with each identifier. In some examples, the characters comprising the key itself may be the same, however the position of those characters, order in which they are read, or the like, may vary, providing a greater number of possibly combinations to be used when generating identifiers. In other examples, the key itself may change between identifiers.

As discussed above, the identifiers themselves may be formed of various numbers of characters (e.g., 20, 32, 64, 128, 90, 150, and the like). Additionally or alternatively, the key itself may be formed of various numbers of characters. For instance, the key may be 5 characters, 10 characters, 12 characters, 16 characters, 32 characters, 50 characters, and the like. Accordingly, the number of identifier and key combinations may be vast, which may provide additional security for processing events.

In some examples, the number of characters in the identifier and/or the key may be determined by a user, system administrator, or the like. Accordingly, the determining user may set the number of characters via the parameter module 117 in the magnetic strip modification computing platform 110.

Figure 3:
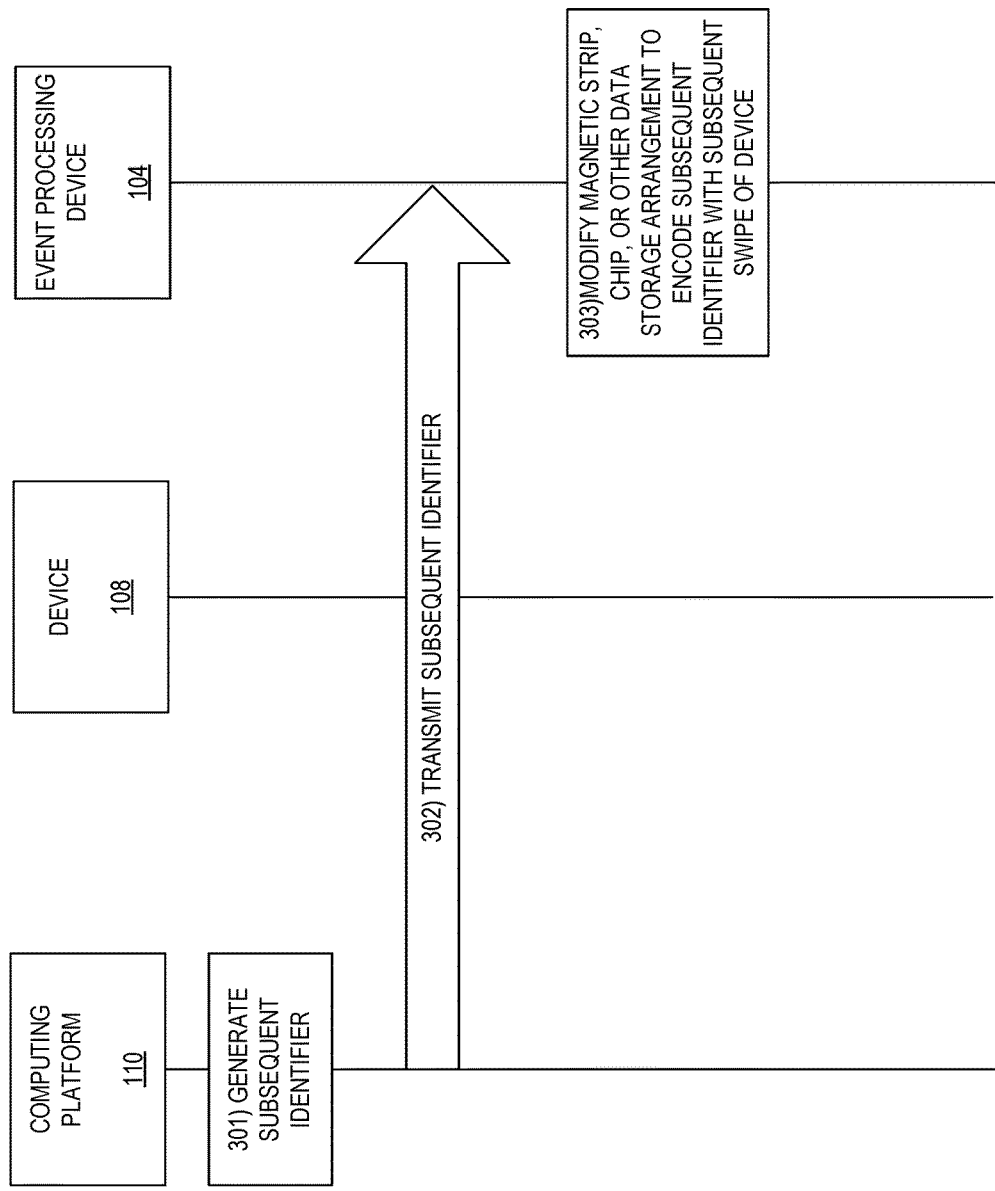
FIG. 3 illustrates an illustrative event sequence for modifying a magnetic strip on a device according to one or more aspects described herein.

FIG. 3 illustrates one example event sequence for modifying magnetic strip, chip, or other data storage arrangement data to provide secure event processing in accordance with one or more aspects described herein. The sequence illustrated in FIG. 3 is merely one example sequence and various other events may be included, or events shown may be omitted, without departing from the invention.

The arrangement shown in FIG. 3 may be used with one or more aspects, steps, and the like, discussed above with respect to FIGS. 1 and 2A-2C. In step 301, a subsequent identifier may be generated by the magnetic strip modification computing platform 110. For instance, after a previous identifier that was embedded on a magnetic strip, chip, or other data storage arrangement on a device 108 has been used to process an event (e.g., a transaction) or after processing a predetermined number of events, a subsequent identifier may be generated. Similar to the second identifier discussed with respect to FIGS. 2A-2C, the subsequent identifier may have a same number of characters as the previous identifier.

In step 302, the subsequent identifier may be transmitted to an event processing device 104. For example, upon an event being authorized (e.g., as discussed above) the device 108 may be swiped a subsequent time at the event processing device 104. This may cause the magnetic strip, chip, or other data storage arrangement to be modified and the subsequent identifier to be encoded or written to the magnetic strip, chip or other data storage arrangement on the device, in step 303. In addition, modifying the magnetic strip, chip, or other data storage arrangement may further include deleting one or more previous identifiers that were used for one or more events.

Figure 4:
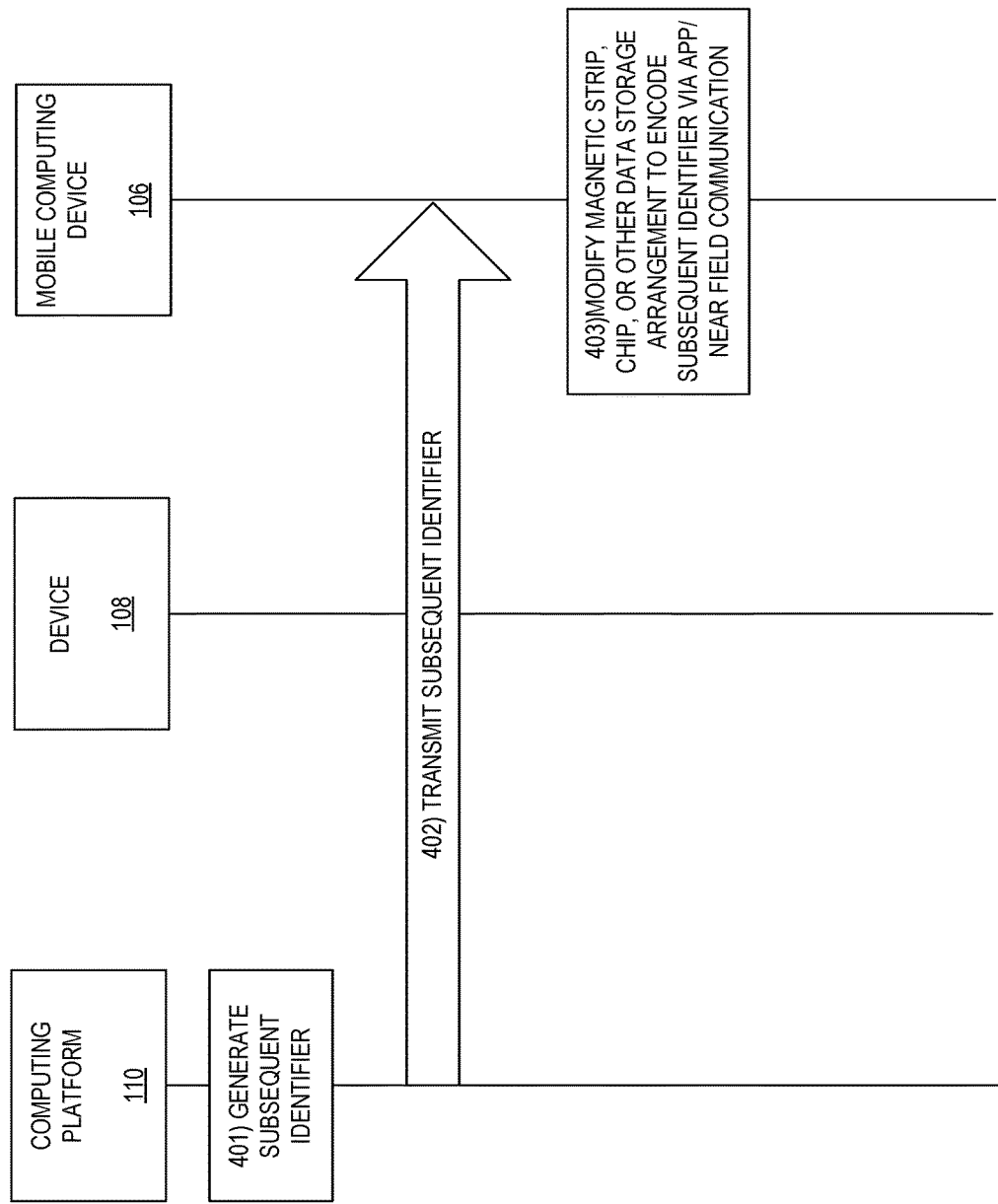
FIG. 4 illustrates another illustrative event sequence for modifying a magnetic strip on a device according to one or more aspects described herein.

FIG. 4 illustrate another example event sequence for modifying magnetic strip, chip, or other data storage arrangement data to provide secure event processing in accordance with one or more aspects described herein. The sequence illustrated in FIG. 4 is merely one example sequence and various other events may be included, or events shown may be omitted, without departing from the invention.

The arrangement shown in FIG. 4 may be used with one or more aspects, steps, and the like, discussed above with respect to FIGS. 1, 2A-2C, and/or 3. In step 401, a subsequent identifier may be generated by the magnetic strip modification computing platform 110. For instance, after a previous identifier that was embedded on a magnetic strip, chip, or other data storage arrangement on a device 108 has been used to process an event (e.g., a transaction) or after processing a predetermined number of events, a subsequent identifier may be generated. Similar to the second identifier discussed with respect to FIGS. 2A-2C, the subsequent identifier may have a same number of characters as the previous identifier.

In step 402, the subsequent identifier may be transmitted to a mobile computing device 106. The mobile computing device 106 may be associated with a user associated with the device 108 and may include a cell phone, smartphone, tablet computing device, and the like. In some arrangements, upon an event being authorized (e.g., as discussed above) the subsequent identifier may be generated, transmitted to the mobile computing device 106, and near-field communication may be used to transfer the subsequent identifier to the magnetic strip, chip, or other data storage arrangement on the device 108. For instance, the device 108 may include a radio frequency identifier (RFID) or other device that may emit a signal. The mobile computing device may detect the signal emitted from the device 108 (e.g., via an application executing on the mobile computing device 108) and, upon detecting, based on the signal, that the device 108 is within a predefined distance of the mobile device 106, the subsequent identifier may be written to the magnetic strip, chip, or other data storage arrangement on the device 108 (e.g., via near-field communication).

Figure 5:
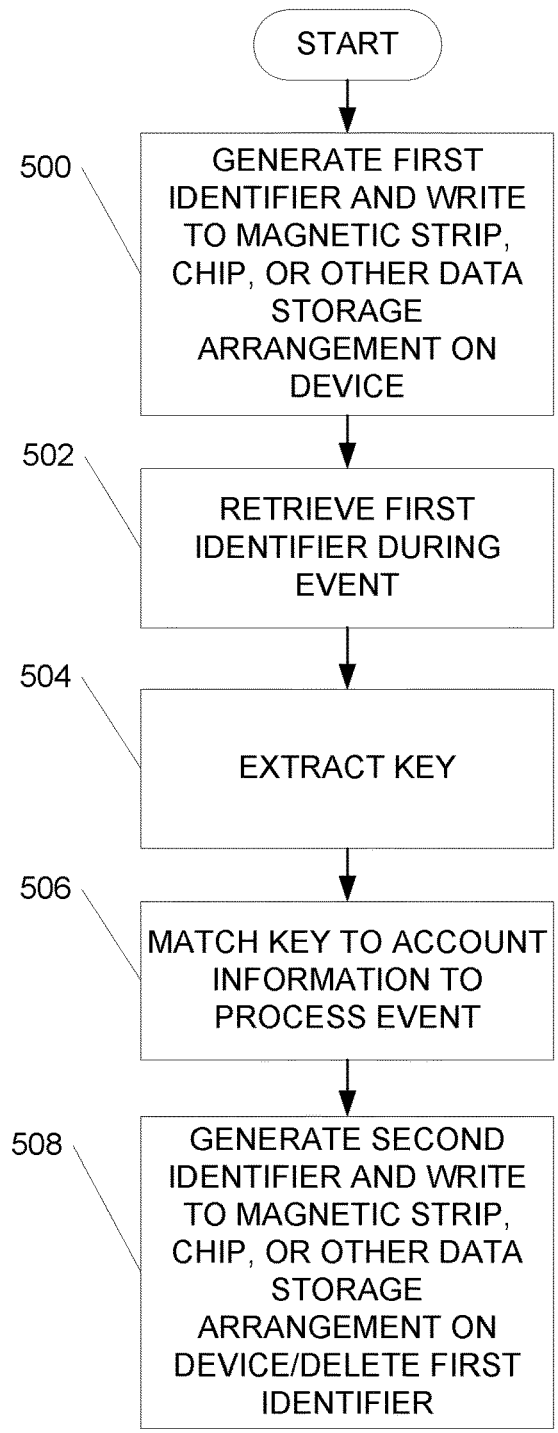
FIG. 5 illustrates one example method of modifying a magnetic strip on a device to provide secure event processing according to one or more aspects described herein.

FIG. 5 illustrates one example method of modifying a magnetic strip, chip, or other data storage arrangement to provide secure event processing according to one or more aspects described herein. In step 500, a first identifier may be generated (e.g., by the identifier generation module 113 of the magnetic strip modification computing platform 110) and written to a device, such as a payment device (e.g., credit card, debit card, and the like).

In step 502, the device may be used to process an event (e.g., make a purchase, process a transaction, and the like). For instance, the device may be swiped at an event processing device and data may be read from the magnetic strip, chip, or other data storage arrangement on the device. The first identifier may be retrieved from the data read and may be transmitted to the magnetic strip modification computing platform 110 for processing.

In step 504, a key may be extracted from the first identifier. As discussed above, the key may include characters from various positions within the first identifier and may be used to look up user and/or account information associated with the device in order to process the event. In step 506, the key may be matched to user and/or account information which may be used to authorize processing of the event. In some examples, a notification of the authorization of the event may be transmitted to the event processing device.

Upon completion of the event (e.g., upon processing and/or authorizing the event) a second identifier may be generated in step 508. The second identifier may have a similar number of characters as the first identifier, as discussed herein. The second identifier may be written to the magnetic strip, chip, or other data storage arrangement on the device (e.g., by swiping the device through the event processing device, using near-field communication, or the like) and the first identifier may be deleted from the magnetic strip, chip, or other data storage arrangement on the device.

As discussed herein, the magnetic strip modification arrangements provide additional security when processing events, such as various transactions. For instance, a user gaining unauthorized access to data stored on a magnetic strip, chip, or other data storage arrangement of a device may be able to obtain an identifier associated with the device. However, the unauthorized user would not be able to extract the key from the identifier, nor would the unauthorized user be able to obtain user and/or account information associated with the device without the key. Further, providing an identifier for a limited time or limited number of uses further improves security in that, should an unauthorized user obtain an identifier, the identifier may be shortly deleted from the device. Further still, identifiers, keys, positions of characters to use for the key, and the like, may vary, have different numbers of characters, and the like. This may provide additional security to the system.

Figure 6:
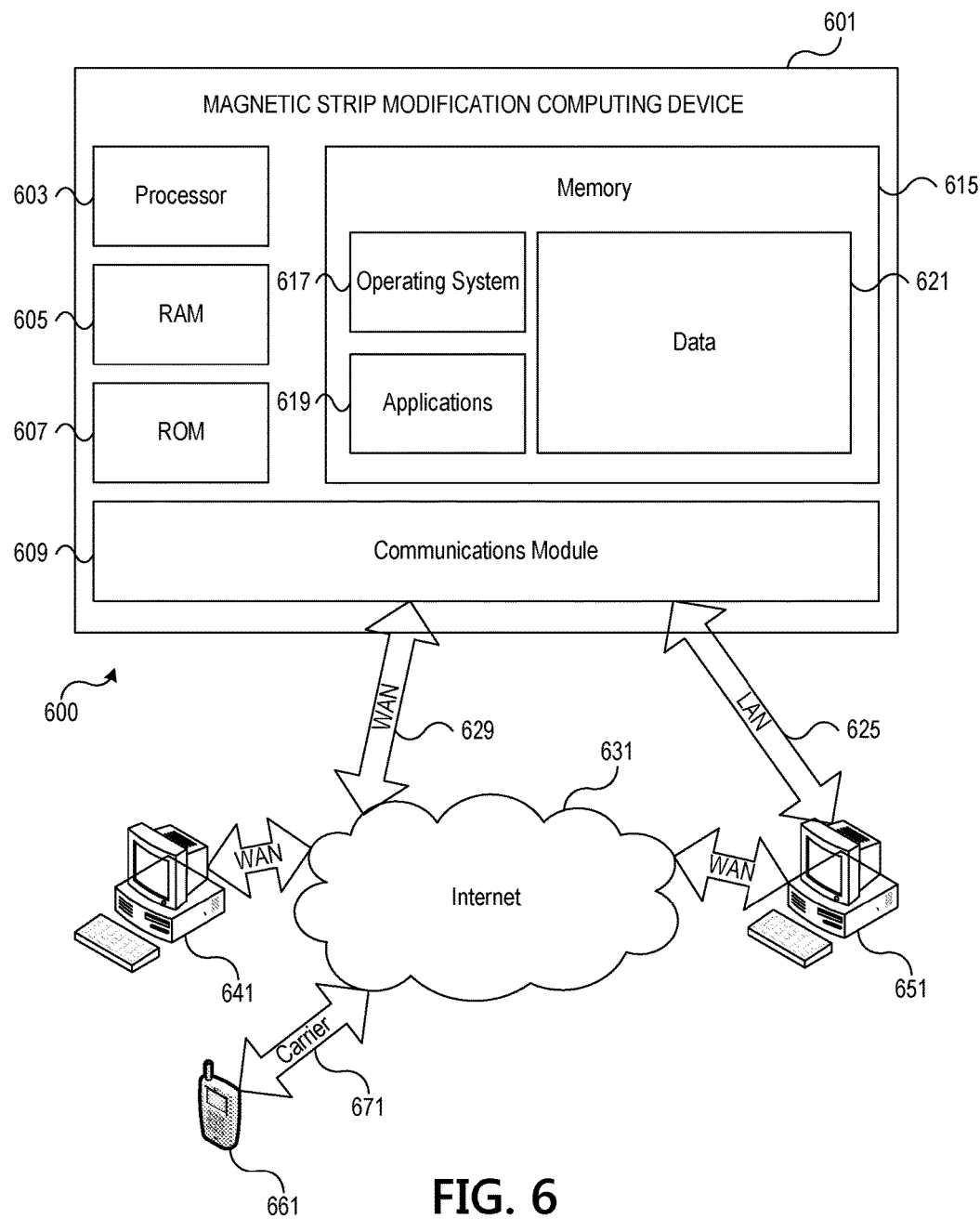
FIG. 6 illustrates one example operating environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include magnetic strip modification computing device 601 having processor 603 for controlling overall operation of magnetic strip modification computing device 601 and its associated components, including random-access memory (RAM) 605, read-only memory (ROM) 607, communications module 609, and memory 615. Magnetic strip modification computing device 601 may include a variety of computer readable media. Computer readable media may be any available media that may be accessed by magnetic strip modification computing device 601, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 601.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on magnetic strip modification computing device 601. Such a processor may execute computer-executable instructions stored on a computer-readable medium.

Software may be stored within memory 615 and/or storage to provide instructions to processor 603 for enabling magnetic strip modification computing device 601 to perform various functions. For example, memory 615 may store software used by magnetic strip modification computing device 601, such as operating system 617, application programs 619, and associated database 621. Also, some or all of the computer executable instructions for magnetic strip modification computing device 601 may be embodied in hardware or firmware. Although not shown, RAM 605 may include one or more applications representing the application data stored in RAM 605 while magnetic strip modification computing device 601 is on and corresponding software applications (e.g., software tasks) are running on magnetic strip modification computing device 601.

Communications module 609 may include a microphone, keypad, touch screen, and/or stylus through which a user of magnetic strip modification computing device 601 may provide input, and may also include one or more of a speaker for providing audio output and a video display device for providing textual, audiovisual and/or graphical output. Computing system environment 600 may also include optical scanners (not shown). Exemplary usages include scanning and converting paper documents, e.g., correspondence, receipts, and the like, to digital files.

Magnetic strip modification computing device 601 may operate in a networked environment supporting connections to one or more remote computing devices, such as computing devices 641, 651, and 661. Computing devices 641, 651, and 661 may be personal computing devices or servers that include any or all of the elements described above relative to magnetic strip modification computing device 601. Computing device 661 may be a mobile device (e.g., smart phone) communicating over wireless carrier channel 671.

The network connections depicted in FIG. 6 may include local area network (LAN) 625 and wide area network (WAN) 629, as well as other networks. When used in a LAN networking environment, magnetic strip modification computing device 601 may be connected to LAN 625 through a network interface or adapter in communications module 609. When used in a WAN networking environment, magnetic strip modification computing device 601 may include a modem in communications module 609 or other means for establishing communications over WAN 629, such as Internet 631 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 7:
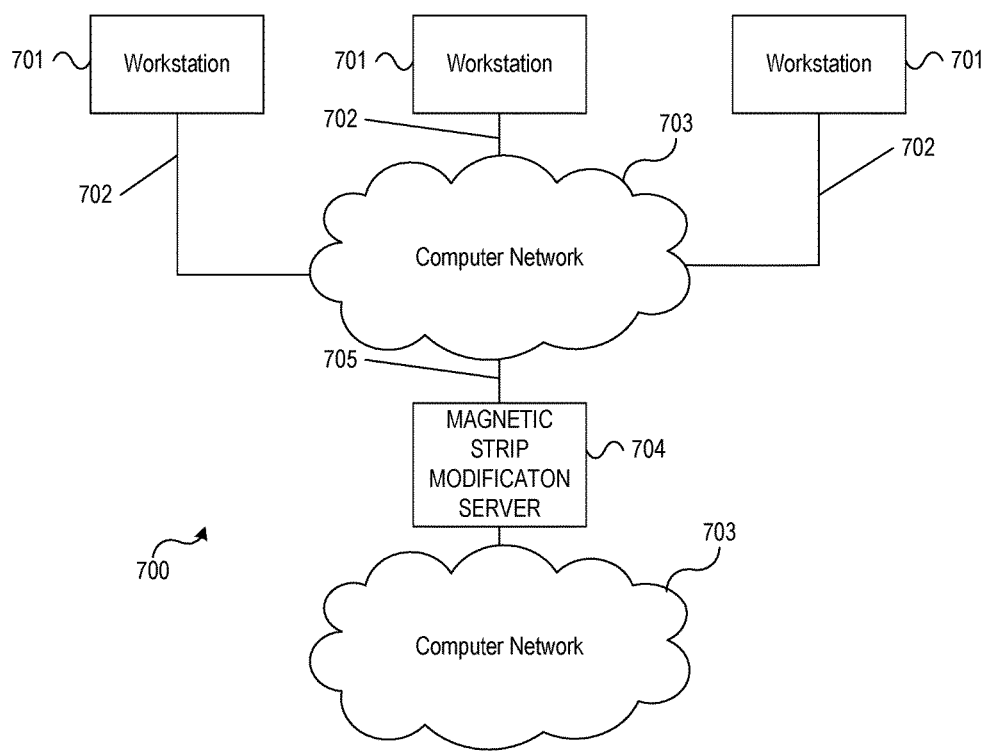
FIG. 7 depicts an illustrative block diagram of workstations and servers that may be used to implement the processes and functions of certain aspects of the present disclosure in accordance with one or more aspects described herein.

FIG. 7 depicts an illustrative block diagram of workstations and servers that may be used to implement the processes and functions of certain aspects of the present disclosure in accordance with one or more example embodiments. Referring to FIG. 7, illustrative system 700 may be used for implementing example embodiments according to the present disclosure. As illustrated, system 700 may include one or more workstation computers 701. Workstation 701 may be, for example, a desktop computer, a smartphone, a wireless device, a tablet computer, a laptop computer, and the like. Workstations 701 may be local or remote, and may be connected by one of communications links 702 to computer network 703 that is linked via communications link 705 to magnetic strip modification server 704. In system 700, magnetic strip modification server 704 may be any suitable server, processor, computer, or data processing device, or combination of the same. Server 704 may be used to process the instructions received from one or more devices, process events, generate identifiers, and the like.

Computer network 703 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 702 and 705 may be any communications links suitable for communicating between workstations 701 and magnetic strip modification server 704, such as network links, dial-up links, wireless links, hard-wired links, as well as network types developed in the future, and the like.

The systems and arrangements described herein generally include aspects directed to providing secure event processing and/or improving security associated with processing various events. As discussed above, embedding an identifier in a magnetic strip, chip, or other data storage arrangement of a device (which may be performed instead of embedding account and/or user information in the magnetic strip to maintain/improve security) provides a secure process for using a device to process an event. If an unauthorized user is able to obtain data from the magnetic strip, chip, or other data storage arrangement, the identifier retrieved would likely be virtually useless to the unauthorized user since he or she would not have the information needed to extract the key, to link the key to the appropriate user and/or account information, and the like. Accordingly, unauthorized access to data from the magnetic strip may be virtually useless to the person accessing the data and may provide additional security for authorized users of the device.

Further, aspects described herein directed to rotating not only identifiers but also a key, number of characters in an identifier, number of characters in a key, and the like, may provide further security for a user. For instance, in some arrangements, a first swipe of a device through an event processing device may cause a first algorithm to be used to generate an identifier, key, or the like, while a subsequent swipe may cause a second, different algorithm to be used to generate an identifier, key, or the like. The second algorithm may cause the identifier, key, or the like, to have different properties, numbers of characters, parameters, or the like.

In addition, use of an identifier for a limited time or limited number of uses provides additional security in that, even if an unauthorized user obtains an identifier, the identifier may only be valid for a limited period of time. This may ensure that even if unauthorized use of a device occurs, the damage may be limited due to a relatively brief period of time in which an identifier is valid.

In still other arrangements, a key may be split between multiple devices, such that multiple devices may be necessary to process and event. For instance, a first device may have a first identifier that may be read to provide a first portion of a key to link the device to event processing information, such as payment information, account information, and the like. A second, different device may have a second, different identifier that may be read to provide a second portion of the key to link the device to the event processing information. Accordingly, both the first device and the second device would be used (swiped, read, or the like) in order for the system to obtain the entire key to identify the appropriate payment or other event processing information.

Further, although various aspects are described herein with respect to a magnetic strip, chip, or other data storage arrangement on a device aspects of generating first, second, and the like, identifiers having a key that may be used to link payment information to a form of payment may be used with one or more applications executing on, for example, a mobile device. For instance, the use of rotating identifiers, keys, and the like, may be implemented in one or more applications that may be used to provide payment or other processing of a transaction.

These and other aspects discussed herein provide secure methods of processing events and maintaining security of user information such as account numbers, and other information that may be used to conduct unauthorized transactions when obtained by unauthorized users.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers or platforms and one or more networks. The functionality may be distributed in any manner, or may be located in a single computing device (e.g., a server, a client computer, and the like), or across multiple computing devices. In such arrangements, any and/or all of the above-discussed communications between modules of the computing platform may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   a processor;
   a communication interface communicatively coupled to the processor; and
   a memory storing computer-readable instructions that, when executed by the processor, cause the computing platform to:
      generate a first identifier having a first number of digits;
      encode the first identifier on a device;
      receive, from a first event processing device, the first identifier retrieved from the device during a first event;
      process the first identifier to extract a key from the first identifier, the key being a subset of digits in the first identifier and including digits in predetermined positions within the first identifier;
      query a database to identify account information of a user for processing the first event, the account information including an account number and the query using as input the key;
      identify the account information and process the first event based on the account information;
      generate a second identifier having the first number of digits, the second identifier including the key; and
      modify the device to include the second identifier and delete the first identifier.

2. The computing platform of claim 1, wherein encoding the first identifier on the device includes encoding the first identifier on a magnetic strip of the device.

3. The computing platform of claim 1, wherein modifying the device to include the second identifier includes modifying a magnetic strip on the device to include the second identifier and delete the first identifier.

4. The computing platform of claim 1, wherein the key extracted from the first identifier includes a plurality of non-consecutive characters from the first identifier.

5. The computing platform of claim 1, further including instructions that, when executed, cause the computing platform to:
   receive, from a second event processing device, the second identifier retrieved from the device during a second event;
   process the second identifier to extract the key from the second identifier;
   query the database to identify the account information of the user for processing the second event, the account information including the account number and the query using as input the key;
   identify the account information and process the second event based on the account information;
   generate a third identifier having the first number of digits; and
   modify the device to include the third identifier and delete the second identifier.

6. The computing platform of claim 1, further including transmitting a notification to the first event processing device of authorization to process the first event.

7. The computing platform of claim 1, wherein the first identifier is retrieved by the first event processing device during a first swipe of the device through the first event processing device and the device is modified to include the second identifier during a subsequent swipe of the device through the first event processing device.

8. A method, comprising:
   generating, by a magnetic strip modification system having at least one processor, a first identifier having a first number of digits;
   encoding, by the magnetic strip modification system, the first identifier on a device;

receiving, from a first event processing device and by the magnetic strip modification system, the first identifier retrieved from the device during a first event;

processing, by the magnetic strip modification system, the first identifier to extract a key from the first identifier, the key being a subset of digits in the first identifier and including digits in predetermined positions within the first identifier;

querying, by the magnetic strip modification system, a database to identify account information of a user for processing the first event, the account information including an account number and the query using as input the key;

identifying, by the magnetic strip modification system, the account information and process the first event based on the account information;

generating, by the magnetic strip modification system, a second identifier having the first number of digits, the second identifier including the key; and modifying, by the magnetic strip modification system, the device to include the second identifier and delete the first identifier.

9. The method of claim 8, wherein encoding the first identifier on the device includes encoding the first identifier on a magnetic strip of the device.

10. The method of claim 8, wherein modifying the device to include the second identifier includes modifying a magnetic strip on the device to include the second identifier and delete the first identifier.

11. The method of claim 8, wherein the key extracted from the first identifier includes a plurality of non-consecutive characters from the first identifier.

12. The method of claim 8, further including:
receiving, from a second event processing device and by the magnetic strip modification system, the second identifier retrieved from the device during a second event;

processing, by the magnetic strip modification system, the second identifier to extract the key from the second identifier;

querying, by the magnetic strip modification system, the database to identify the account information of the user for processing the second event, the account information including the account number and the query using as input the key;

identifying, by the magnetic strip modification system, the account information and process the second event based on the account information;

generating, by the magnetic strip modification system, a third identifier having the first number of digits; and modifying, by the magnetic strip modification system, the device to include the third identifier and delete the second identifier.

13. The method of claim 8, further including transmitting, by the magnetic strip modification system, a notification to the first event processing device of authorization to process the first event.

14. The method of claim 8, wherein the first identifier is retrieved by the first event processing device during a first swipe of the device through the first event processing device and the device is modified to include the second identifier during a subsequent swipe of the device through the first event processing device.

15. One or more non-transitory computer-readable media storing instructions that, when executed by a computer system comprising at least one processor, memory, and a communication interface, cause the computer system to:

generate a first identifier having a first number of digits;
encode the first identifier on a device;
receive, from a first event processing device, the first identifier retrieved from the device during a first event;
process the first identifier to extract a key from the first identifier, the key being a subset of digits in the first identifier and including digits in predetermined positions within the first identifier;
query a database to identify account information of a user for processing the first event, the account information including an account number and the query using as input the key;
identify the account information and process the first event based on the account information;
generate a second identifier having the first number of digits, the second identifier including the key; and
modify the device to include the second identifier and delete the first identifier.

16. The one or more non-transitory computer-readable media of claim 15, wherein encoding the first identifier on the device includes encoding the first identifier on a magnetic strip of the device.

17. The one or more non-transitory computer-readable media of claim 15, wherein modifying the device to include the second identifier includes modifying a magnetic strip on the device to include the second identifier and delete the first identifier.

18. The one or more non-transitory computer-readable media of claim 15, wherein the key extracted from the first identifier includes a plurality of non-consecutive characters from the first identifier.

19. The one or more non-transitory computer-readable media of claim 15, further including instructions that, when executed, cause the computer system to:
receive, from a second event processing device, the second identifier retrieved from the device during a second event;
process the second identifier to extract the key from the second identifier;
query the database to identify the account information of the user for processing the second event, the account information including the account number and the query using as input the key;
identify the account information and process the second event based on the account information;
generate a third identifier having the first number of digits; and
modify the device to include the third identifier and delete the second identifier.

20. The one or more non-transitory computer-readable media of claim 15, further including transmitting a notification to the first event processing device of authorization to process the first event.

21. The one or more non-transitory computer-readable media of claim 15, wherein the first identifier is retrieved by the first event processing device during a first swipe of the device through the first event processing device and the device is modified to include the second identifier during a subsequent swipe of the device through the first event processing device.

* * * * *